(12) United States Patent
Thieme (10) Patent No.: US 10,323,915 B2
(45) Date of Patent: Jun. 18, 2019

(54) VARIABLE FIREWORK BATTERY

(71) Applicant: Ringo Thieme, Borkwalde (DE)

(72) Inventor: Ringo Thieme, Borkwalde (DE)

( * ) Notice: Subject to any disclaimer, the term of this patent is extended or adjusted under 35 U.S.C. 154(b) by 0 days.

(21) Appl. No.: 15/507,259

(22) PCT Filed: Sep. 7, 2015

(86) PCT No.: PCT/EP2015/070379
§ 371 (c)(1),
(2) Date: Feb. 28, 2017

(87) PCT Pub. No.: WO2016/037979
PCT Pub. Date: Mar. 17, 2016

(65) Prior Publication Data
US 2017/0284778 A1    Oct. 5, 2017

(30) Foreign Application Priority Data

Sep. 8, 2014    (DE) .......................... 10 2014 112 905

(51) Int. Cl.
*F42B 4/20*    (2006.01)
*F42B 4/24*    (2006.01)

(52) U.S. Cl.
CPC . *F42B 4/20* (2013.01); *F42B 4/24* (2013.01)

(58) Field of Classification Search
CPC ................................. F42B 4/20; F42B 4/24
USPC ................ 102/343, 345, 349, 352, 358, 360
See application file for complete search history.

(56) References Cited

U.S. PATENT DOCUMENTS 1,291,584 A * 1/1919 Martin

FOREIGN PATENT DOCUMENTS

| CN | 2569091 | 8/2003 |
|---|---|---|
| CN | 101672604 | 3/2010 |
| CN | 202048846 | 11/2011 |
| CN | 202582384 | 12/2012 |
| CN | 202582385 | 12/2012 |
| CN | 202648538 | 1/2013 |
| DE | 29504875 | 8/1995 |
| DE | 20213633 | 1/2003 |
| DE | 102010016642 | 11/2011 |
| DE | 202012001218 | 7/2012 |
| EP | 1262730 | 12/2002 |

(Continued)

OTHER PUBLICATIONS

Notification of Office Action and Search Report dated Jan. 11, 2018 From the State Intellectual Property Office of the People's Republic of China Re. Application No. 201580044862.7 and Its Translation Into English. (12 Pages).

(Continued)

*Primary Examiner* — Bret Hayes (57) ABSTRACT

The invention relates to a firework battery (10), comprising at least one receiving part (11) for at least one pyrotechnic charge (20) and a border (13), which is connected via at least one hinge part (14) to a further receiving part (11) and/or an extension element (15) that continues the border and that is arranged on a receiving part (11), the axis of rotation of the hinge part being arranged vertically in relation to a ground. According to the invention, it is provided that the geometric arrangements of the receiving part (11) and/or of the extension element (15) are movable relative to one another, whereby a bordered support base (30) of the firework battery (10) is enlarged.

19 Claims, 4 Drawing Sheets

(56) References Cited

FOREIGN PATENT DOCUMENTS

| | | |
|---|---|---|
| FR | 2854946 A1 * 11/2004 | ................ F42B 4/20 |
| JP | 01-094798 | 4/1989 |
| JP | 01-088199 | 6/1989 |
| JP | 04-073800 | 3/1992 |
| JP | 07-218193 | 8/1995 |
| JP | 2004-132675 | 4/2004 |
| WO | WO 2013/110277 | 8/2013 |

OTHER PUBLICATIONS

Mitteilung Gemäss Artikel 94(3) EPÜ[Communication Pursuant to Article 94(3) EPC] Dated May 3, 2018 From the European Patent Office Re. Application No. 15763271.2 and Its Summary in English. (9 Pages).

* cited by examiner

VARIABLE FIREWORK BATTERY

RELATED APPLICATIONS

This application is a National Phase of PCT Patent Application No. PCT/EP2015/070379 having International filing date of Sep. 7, 2015, which claims the benefit of priority of German Patent Application No. 10 2014 112 905.9 filed on Sep. 8, 2014. The contents of the above applications are all incorporated by reference as if fully set forth herein in their entirety.

The present invention relates to a firework battery according to the preamble of claim 1, comprising at least one receiving part for at least one pyrotechnic charge and a border, which is connected via at least one hinge part to a further receiving part and/or an extension element that continues the border and that is arranged on a receiving part, wherein the axis of rotation of the hinge part is arranged vertically in relation to a ground. The present invention furthermore relates to a method for pivoting a firework battery according to the preamble of claim 19.

FIELD AND BACKGROUND OF THE INVENTION

It is known from the general prior art to equip firework batteries with a bottom plate, wherein the support base of the firework battery is enlarged by extension elements. This establishes increased stability in that the extension elements arranged on the base plate can each be folded open about a horizontal hinge axis in the direction of the substrate. Such a firework battery is disclosed in document EP 1 262 730 B1, for example. Moreover, document DE 10 2010 016 642 A1 discloses an option for enlarging the support base, in which the extension elements can be rotated about an axis of rotation, whereby the support base of the firework battery is enlarged.

Solutions described above, however, have the disadvantage that additional extension elements often increase the space requirement of the firework battery proportionally with the size of the extension elements. At the same time, if the extension elements are designed too small so as to minimize the space requirement, the necessary stability is no longer provided, so that one must weigh between the desired space requirement and the desired stability. In particular in the case of firework batteries, the space requirement is of increased importance for transport since the transportation costs are very high given the increased explosion hazard. Accordingly, manufacturers desire to minimize the space requirement to as great an extent as possible so as to minimize the transportation costs as much as possible, while also complying with the required safety regulations associated with the use of the firework batteries.

SUMMARY OF THE INVENTION

It is therefore the object of the present invention to at least partially eliminate the above-described disadvantages in a firework battery. In particular, it is the object of the present invention to create a firework battery and a method for enlarging the bordered support base of a firework battery, wherein at the same time the space requirement of the firework battery is reduced in a simple and cost-effective manner.

The above object is achieved by a firework battery and by a method for pivoting a firework battery having the features of claims 1 and 19. Further features and details of the invention will be apparent from the dependent claims, the description and the drawings. It goes without saying that features and details that are described in connection with the firework battery also apply in connection with the method according to the invention, and vice versa, so that mutual reference is made, or can be made, in each case to the individual aspects of the invention with respect to the disclosure.

The firework battery according to the invention comprises at least one receiving part for at least one pyrotechnic charge and a border, which is connected via at least one hinge part to a further receiving part and/or an extension element that continues the border and that is arranged on a receiving part, wherein the axis of rotation of the hinge part is arranged vertically in relation to a ground. The geometric arrangements of the receiving part and/or of the extension element are movable relative to one another, whereby a bordered support base of the firework battery is enlarged.

A receiving part shall be understood to mean a geometric body in or on which at least one pyrotechnic charge can be arranged. A pyrotechnic charge is a mixture of substances for generating acoustic, visual, thermal or mechanical effects, wherein the mixture is composed of explosive substances that are subject to appropriate legal regulations, whereby the costs for transportation and storage are increased. The border of the firework battery is formed by all outer surfaces of the receiving parts and extension elements according to the invention, resulting in a bordered support base. An extension element differs from a receiving part in that no pyrotechnic charges are arranged in the extension element, and the element thus serves only as a border and contact surface. The term "ground" according to the invention describes any substrate that serves a firework battery according to the invention for the intended purpose, which is to say in the usage position. Thus, figuratively speaking, the vertical arrangement of the axis of rotation of a hinge part protrudes from the ground.

Accordingly, a firework battery according to the invention considerably increases the stability, and thus the safety, due to the enlarged support base. This is implemented in particular by the fact that the receiving parts and/or the extension elements can be moved toward and/or away from one another, so that either the support base is enlarged or the space requirement is decreased. Moreover, a variable geometric arrangement allows the appearance of the pyrotechnic charge to be influenced by way of differing arrangements. Furthermore, the defined border additionally offers a surface area for safety warnings, instructions for use, or advertisements.

Within the scope of the invention, at least one receiving part and/or at least one extension element can be secured by way of at least one foldable brace element. The brace element can be designed to cover the entire surface area, a partial surface area or merely as a rib compared to the receiving part or extension element. The brace element can be folded about a horizontal axis from a transport position into a usage position, wherein, in the transport position, the extension element has only little influence on the space requirement, and in the usage position, the brace element braces the receiving part and/or the extension element when folded open. The receiving part and/or the extension element are thus retained in the folded-open forms thereof, whereby the stability is thereby further increased, and a displacement of the at least one receiving part or of the at least one extension element is prevented. Moreover, the surface area of the brace element likewise offers additional options for positioning hazard information, instructions, or advertisement.

The at least one brace element is arranged on the receiving part or the extension element so as to point in the direction of the bordered support base when folded open and become seated against at least one surface area of the receiving part and/or of the extension element. According to the invention, the brace element can be arbitrarily arranged along the vertical axis, which is to say the height of the firework battery, in a horizontal position. This results in a surface area that is arranged substantially parallel to the ground and formed by the brace element. Depending on the configuration of the brace element according to the invention, a clamping effect is achieved in that the brace element has a larger geometric shape than the surface area defined by the at least one receiving part and the at least one extension element.

Furthermore, it is conceivable that the bordered support base can have a closed border or an open border. Consequently, the border may be interrupted in one area, resulting in further geometric arrangements of the receiving part and/or of the extension element. The restriction to a particular geometric shape, which is determined by a continuous border, may be eliminated by an open border. This also results in the advantage that the arrangement of the firework battery can be individually adapted. Moreover, this results in further folding options, by way of which the space requirement can be reduced. A closed border has the advantage that the stability is considerably increased compared to an open border, in particular in the usage position.

According to the invention, at least one brace element can be held by a foldable retaining element. Accordingly, the stability of the firework battery, and in particular the stability of the brace element, is additionally strengthened. A foldable retaining element is folded about a vertical rotational axis from a transport position, in which the retaining element rests against a receiving part or an extension element, into a usage position, in which an edge of the retaining element becomes seated against a surface area of the brace element, so that this can be secured at least partially against a movement in the vertical direction. Accordingly, a bracing action is advantageously achieved when the surface area of the brace element is loaded in the vertical direction.

It is likewise advantageous when a mechanical fold-out resistance of the at least one receiving part and/or of the at least one extension element can be established by way of an adhesive bond, a hook-and-loop fastener, a perforation, or a thread made of cellulose. A fold-out resistance prevents the firework battery from inadvertently folding open, so that the same is held in the transport position thereof until the fold-out resistance is detached. An adhesive bond has the advantage that this can be established comparatively inexpensively and without major complexity. A perforation has the advantage that this is stable, and nonetheless easy to separate, in particular for forming a hinge part, whereby the border can be easily separated in this area. A fold-out resistance made of cellulose, for example in the form of a thread or a paper strip, had the advantage of a stable and simultaneously cost-effective design.

According to the invention, it is conceivable that at least two surface areas of a receiving part and/or of an extension element can have a miter joint. The miter forms the bisector of the angle with which the two parts correlate. As a result, the two surface areas exactly fit on top of one another, resulting in a smooth transition between the two parts. When two receiving parts are arranged at an angle of 90°, for example, the miter is formed by an angle of 45° at the ends of the receiving parts. This results in the advantage that the contact or joining surface is enlarged, which increases stability. Moreover, what is known as the butt joint of the two parts coincides with an edge and is thus less apparent. Corresponding advantages result in particular in the case of a miter of the receiving parts, since flush and stable rigidity is created by the butt joint, which is enlarged compared to the extension element, in particular when used without extension elements. A miter according to the invention, however, is not limited to the above-mentioned 45° or bisecting configuration. It is also conceivable to additionally secure the desired position by way of adhesive spots on the contact or joining surface.

Within the scope of the invention, it is conceivable that the extension element does not have the same height as a receiving part. The advantage results from the material savings, and a cost reduction associated therewith, as well as the environmentally friendly conservation of resources. At the same time, a weight reduction is achieved, resulting in further savings in the shipping and transportation costs. Since the defined support base of a firework battery according to the invention is not enlarged by the largest surface area of the extension element, but by an edge of the extension element, the height can be arbitrarily designed. Accordingly, the extension element can be dimensioned in accordance with the desired stability and the optional inclusion of a support or retaining element.

It may be advantageous if at least one brace element can be folded out of a receiving part and/or an extension part. The term "out" shall be understood to mean that a brace element according to the invention is formed within the at least one surface area of a receiving part and/or of an extension element so that this can be folded out of this surface area, without providing additional material. Analogously, this may also be a retaining element. In addition to the space savings, the material costs can also be lowered. So as to hold a corresponding brace element or a retaining element in an appropriate transport position, it is also conceivable to secure the elements by way of an adhesive bond, a perforation, or a cellulose connection.

It is likewise advantageous if at least one hinge part comprises metal and/or plastic and/or cellulose. Metal has the advantage of having high fatigue strength and being resistant to environmental conditions such as rain or snow, whereby the durability of the firework battery, and in particular of the hinge part, is increased. The same also applies to the configuration of a plastic hinge part, wherein additionally material and production costs can be reduced. Cellulose is particularly environmentally friendly since it can be produced from renewable resources in a way that is substantially carbon-neutral, and the material costs can be kept low at the same time.

It is furthermore conceivable that at least one hinge part comprises a perforation, whereby the border can be separated. Accordingly, the joint can be easily separated during use, so that no additional auxiliary means are needed for opening. After the hinge part has been separated along the perforation, the variability in terms of the arrangement is considerably increased, resulting in numerous positioning options. The perforation moreover has the advantage that, if the same should not be separated, sufficient stability is provided by the border, without requiring additional reinforcing material to do so.

According to the invention, at least one fuse is arranged in the firework battery, by way of which the at least one pyrotechnic charge can be ignited. During use, the user can thus evoke the pyrotechnic effect by simple ignition of the fuse. Furthermore, it is conceivable that a fuse is arranged on a receiving part and/or an extension element, and in particular that the one fuse end protrudes from the border. Accordingly, the fuse end is easily accessible during use, so that safe ignition of the fuse end is possible, without reaching across a receiving part or an extension element. It is conceivable in this regard that the one fuse end can be folded out of the border, so that this end is protected against environmental conditions. It is also conceivable to secure the fuse end protruding from the border on a receiving part or an extension element. According to the invention, the other fuse end protrudes into a receiving part or an extension element and extends to at least one pyrotechnic charge, so that this charge, when the fuse is ignited, can achieve the intended pyrotechnic effect thereof.

In accordance with the invention, the fuse can be used to pyrotechnically connect at least two receiving parts to one another, and in particular, the fuse can be routed through at least one hinge part, so that only a single ignition is required to start a plurality of pyrotechnic charges. This allows multiple pyrotechnic charges to be ignited during use by igniting only one fuse end. Moreover, an installation path of the fuse through at least one hinge part is protected against environmental conditions, whereby the functional capability is further increased. If the firework battery is composed of a plurality of receiving parts and/or extension elements, for example, an installation according to the invention of the fuse, despite changing the geometric arrangement of the receiving parts and/or extension elements in relation to one another, allows all pyrotechnic charges of the firework battery to be ignited by a single ignition of the fuse.

Furthermore, it is conceivable that at least one further fuse can be arranged on a receiving part and/or an extension element, wherein the one fuse end protrudes from the border. The other fuse end also protrudes into the at least one pyrotechnic charge, so that the same can cause the desired pyrotechnic effect after the fuse has been ignited. A second fuse increases the reliability of the firework battery, so that the pyrotechnic effect can still be achieved if the first fuse should fail. The second fuse can also be routed through at least one hinge part, so that only a single ignition is needed when multiple pyrotechnic charges are used.

According to the invention, at least one receiving part and/or one extension element and/or one hinge part can comprise cellulose, plastic, wood or metal. The use of cellulose is particularly environmentally friendly since a production using renewable resources is made possible, incurring low material costs at the same time. The use of a plastic material offers the advantage of long durability and high resistance to environmental conditions as well as applications of forces, caused by transport or improper handling. Similar properties also result when using metal, wherein additionally an ecological advantage can be achieved by material recycling.

Furthermore, it is conceivable that at least one further pyrotechnic charge can be received in the support base, and in particular on the retaining elements. The enlarged bordered support base of the firework battery when folded out creates new space, in which at least one further pyrotechnic charge can be received, for which there is no room when the firework battery is folded together. This turns the support base into a receiving part for at least one pyrotechnic charge, whereby the stability of the firework battery is further increased. In addition, a plurality of pyrotechnic charges within the support base positively influences the visual design and number of pyrotechnic effects.

It is likewise advantageous if at least one further pyrotechnic charge can be secured by at least one brace element and/or one retaining element. A subsequently introduced pyrotechnic charge is accordingly secured against displacement and/or an inadvertent change in position, whereby the safety of the firework battery is also increased. A subsequently introduced pyrotechnic charge can thus become seated against at least one brace element and/or one retaining element, and can thus be secured in the position thereof.

According to the invention, the at least one receiving part and/or the at least one extension element can be movable in relation to one another in a range of 0° to 180°, in particular in a range of 30° to 120°, and preferably in a range of 45° to 90°.

According to a further aspect of the invention, a method for pivoting a firework battery is claimed, comprising at least one receiving part for at least one pyrotechnic charge having a border, which is connected via at least one hinge part to a further receiving part and/or an extension element that continues the border and that is arranged in a receiving part, wherein the axis of rotation of the hinge part is arranged vertically in relation to a ground. The geometric arrangements of the receiving part and/or of the extension element are movable relative to one another, whereby a bordered support base of the firework battery is enlarged.

The described experiences result in all the advantages that were already described with respect to the firework battery according to the invention.

BRIEF DESCRIPTION OF THE SEVERAL VIEWS OF THE DRAWINGS

Further measures improving the invention will be apparent from the following description of several exemplary embodiments of the invention, which are schematically illustrated in the figures. All of the features and/or advantages that are apparent from the claims, the description or the drawings, including design details, arrangements in terms of space, and method steps, can be essential to the invention, both alone and in a wide variety of combinations. The drawings in each case show schematic illustrations:

Elements having identical functions and modes of operation are in each case denoted by identical reference numerals in FIGS. 1 to 11.

DESCRIPTION OF SPECIFIC EMBODIMENTS OF THE INVENTION

Figure 1:
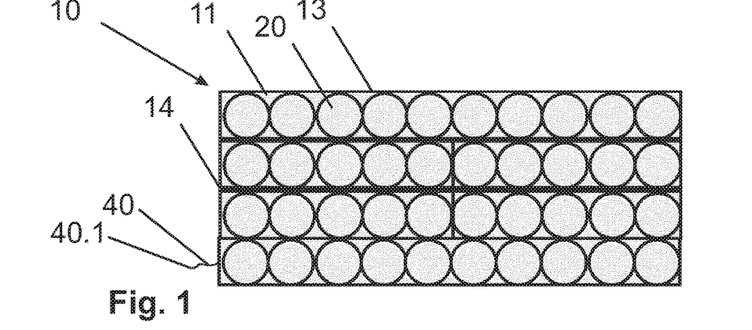
FIG. 1 shows a first embodiment of the device according to the invention in the transport position.

FIG. 1 schematically shows a first embodiment of the firework battery 10 according to the invention in the transport position, comprising six receiving parts 11 here by way of example. Each receiving part 11 is equipped with a plurality of pyrotechnic charges 20, which are arranged in single rows in the receiving parts 11. Each receiving part 11 comprises a border 13 and two hinge parts 14. In the shown transport position, the receiving parts 11 are arranged directly against one another, so that no intermediate space is created between receiving parts 11, whereby the defined support base 30 and the space requirement of the firework battery 10 are as small as possible. The firework battery 10 shown in FIG. 1 has a rectangular shape, wherein the long sides comprise two receiving parts 11 toward the outside, the lengths of which are twice as long as the receiving parts 11 located on the inside. This results in an arrangement of two longer receiving parts 11 on the two long sides, between which four receiving parts 11 half as long are arranged. In the transport position, the surface area of the firework battery 10 surrounded by the border 13 has the same size as the sum of the surface areas of all receiving parts 11. A fuse 40 having a fuse end 40.1 is shown on one receiving part 11 of the firework battery 10, wherein the second fuse end, which protrudes into the at least one pyrotechnic charge 20, is not shown in detail.

Figure 2:
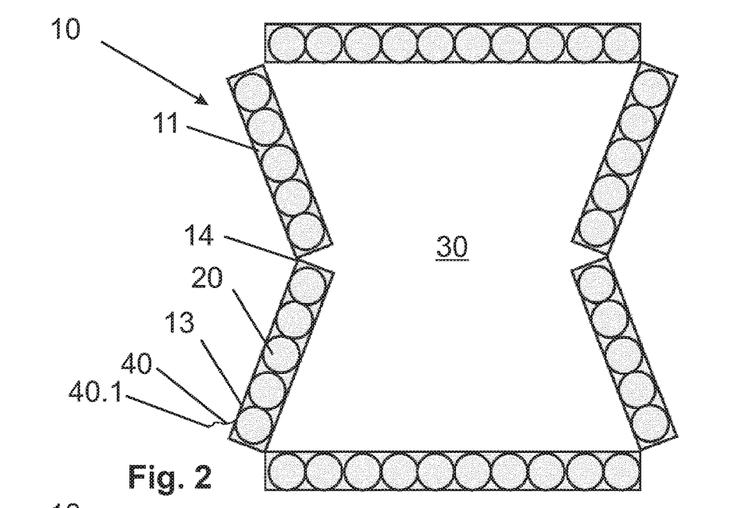
FIG. 2 shows a first embodiment of the firework battery according to the invention in a first usage position.

FIG. 2 schematically shows a firework battery 10 according to the invention in a first usage position, in which the support base 30 of the firework battery 10 surrounded by the border 13 is considerably enlarged compared to the firework battery 10 shown in FIG. 1. In a first usage position, the two receiving parts 11 forming the long side are arranged at a considerable distance from one another, so that a support base 30 has formed between all receiving parts 11. In the first usage position, the four shorter receiving parts 11, which previously, in the transport position, were arranged between the receiving parts 11 forming the long edge, only make contact with one another still at the hinge parts 14, and no longer along the long and/or short sides thereof. Accordingly, the arrangement of the pyrotechnic charges 20 of the firework battery 10 relative to one another also changes. An acute angle or an obtuse angle, which can be varied by displacing the receiving parts relative to one another, is thus formed between the individual receiving parts 11.

Figure 3:
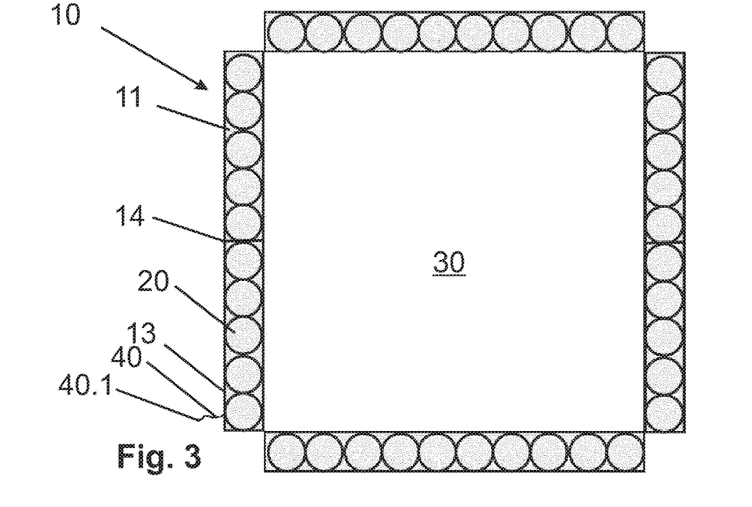
FIG. 3 shows a first embodiment of the firework battery according to the invention in a further usage position.

FIG. 3 shows the first embodiment of a firework battery 10 according to the invention in a further usage position, wherein the bordered support base 30 is as large as possible in the shown position. As is apparent, all sides of the firework battery 10 have the same length in the further usage position, so that a rectangular support base 30 is formed, which is surrounded by the border 13. At the four corners of the support base 30, the receiving parts 11 are situated at a right angle relative to one another and only make contact with one another still via the hinge parts 14. Two of the receiving parts 11 half as long have a shared abutting surface along the short side of the receiving part 11 in the second usage position, so that these, along the long side, form a shared straight line, which in sum has the same length as the long receiving parts 11. In the illustrated usage position, the defined support base 30 has doubled compared to the transport position shown in FIG. 1, whereby increased stability is achieved. The border 13 also has a maximum visible circumference in the usage position shown in FIG. 3, whereby the circumferential surface area is also enlarged accordingly. This surface area can be used for information and advertising purposes, for example.

Figure 4:
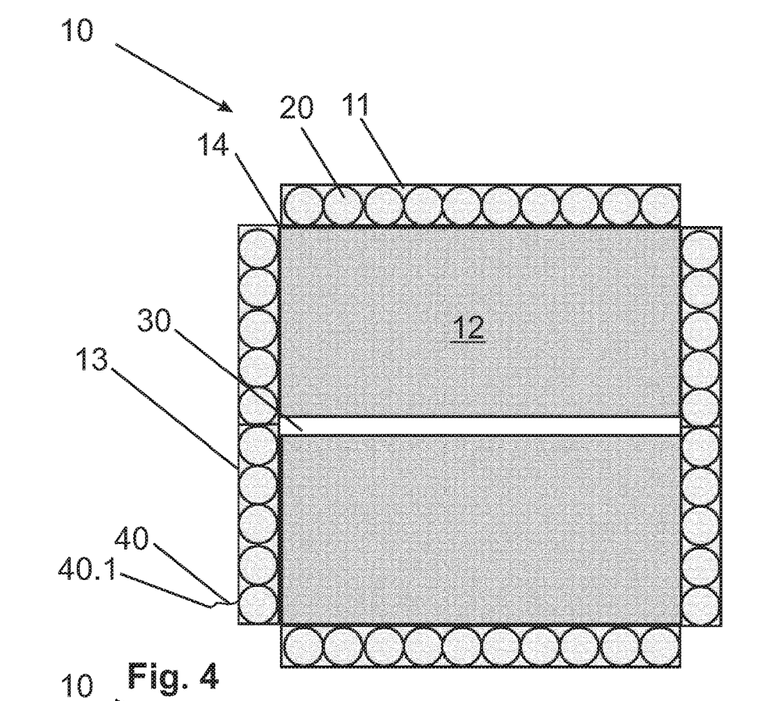
FIG. 4 shows a second embodiment of the firework battery according to the invention comprising a brace element.

FIG. 4 illustrates a second embodiment of the firework battery 10 according to the invention, wherein the firework battery 10 in the second embodiment comprises two brace elements 12, which in the illustrated folded-out position hold the receiving parts 11 in the usage position. According to the invention, the brace elements 12 are connected to the one long side of the receiving parts 11 via a hinge part 14 and, in the transport position, can be folded about the hinge part 14, so that the surface area of the brace elements 12 rests against the one surface area of the long receiving part 11, whereby the firework battery 10 assumes the shape shown in FIG. 1 in the transport position. According to the invention, the brace elements 12 can have differing sizes and do not have to become seated against the entire long side of the receiving parts 11. The brace elements 12 shown in FIG. 4 provide extensive bracing action for the receiving parts 11 since they cover the majority of the support base 30 and thus are seated along almost the entire long side of the receiving parts 11.

The brace elements 12 furthermore create a cover for the support base 30, allowing additional information and/or advertisement to be displayed on this defined surface area, and furthermore establishing a surface area which is protected against environmental conditions and on which further pyrotechnic charges 20 can be arranged. It is thus conceivable that the brace elements 12 are made of a material that is at least partially designed to be moisture-proof and/or moisture-inhibiting, whereby the stability of the brace elements 12 is not adversely impacted by moisture.

Figure 5:
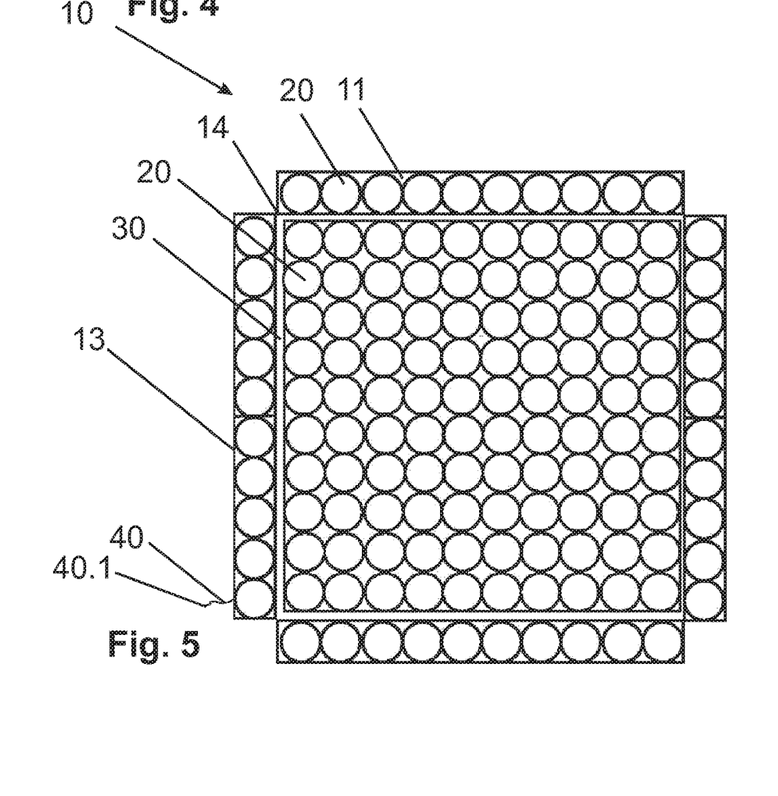
FIG. 5 shows a second embodiment of the firework battery according to the invention comprising an additional pyrotechnic charge.

FIG. 5 shows a third embodiment of the firework battery 10 according to the invention, in which a plurality of pyrotechnic charges 20 are arranged in the defined support base 30. In the illustrated usage position, the receiving parts 11 form a square support base 30, which forms sufficient space for further pyrotechnic charges 30. It is conceivable for further pyrotechnic charges 20 to be arranged on a carrier, which, in the usage position of the firework battery 10, is arranged between the receiving parts 11 on the support base 30, so that the number of pyrotechnic charges 20 is considerably increased, whereby the pyrotechnic effects of the firework battery 10 yield a greater variety in the display.

By arranging the additional pyrotechnic charges 20 on a carrier in the support base 30, an effect comparable to that of the brace elements 12 is achieved. In this way, a displacement of the receiving parts 11 out of the usage position into the transport position is prevented, so that increased safety is ensured. Accordingly, numerous advantages result in the third embodiment according to FIG. 5, which, in addition to increased safety, also result in a positive influence on the pyrotechnic effects or the number of the pyrotechnic effects.

Figure 6:
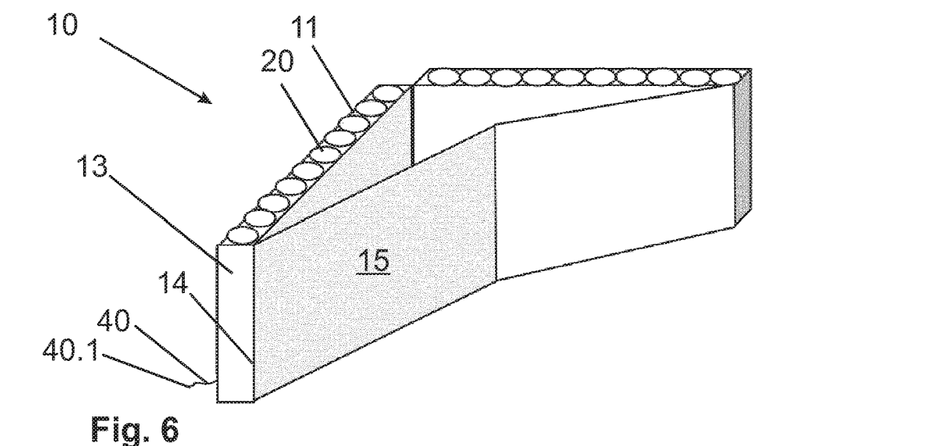
FIG. 6 shows a third embodiment of the firework battery according to the invention in a first usage position.

FIG. 6 illustrates a fourth embodiment of the firework battery 10 according to the invention, comprising only two receiving parts 11 having a height h, which receive pyrotechnic charges 20. In addition to the two receiving parts 11, the fourth embodiment in FIG. 6 comprises two extension elements 15, which lengthen the border 13 of the firework battery 10. Respective hinge parts 14 are arranged between the receiving parts 11 and the extension elements 15, so that both the receiving parts 11 and the extension elements 15 can be pivoted with respect to one another. In the illustrated embodiment, an arrowhead-like shape of the firework battery 10 is obtained, which as a result of the two receiving parts 11, which are arranged at a right angle relative to one another, and the two extension elements 15, which in the first folded-out position are arranged such that the hinge part 14 between the two receiving parts 11 and the hinge part 14 between the two extension elements 15 are aligned. The extension elements 15 thus enlarge not only the bordered support base 30, but also the circumference of the border 13 itself. This increases the stability of the firework battery 10 according to the invention.

In the figure, the extension elements 15 have the same height and length, and thus the same overall surface area, as the receiving parts 11. According to the invention, however, it may be provided that the surface area of the extension elements 15 is considerably reduced compared to the surface area of the receiving parts 11. This saves material, whereby a weight reduction is also achieved, resulting in less expensive transportation costs.

Figure 7:
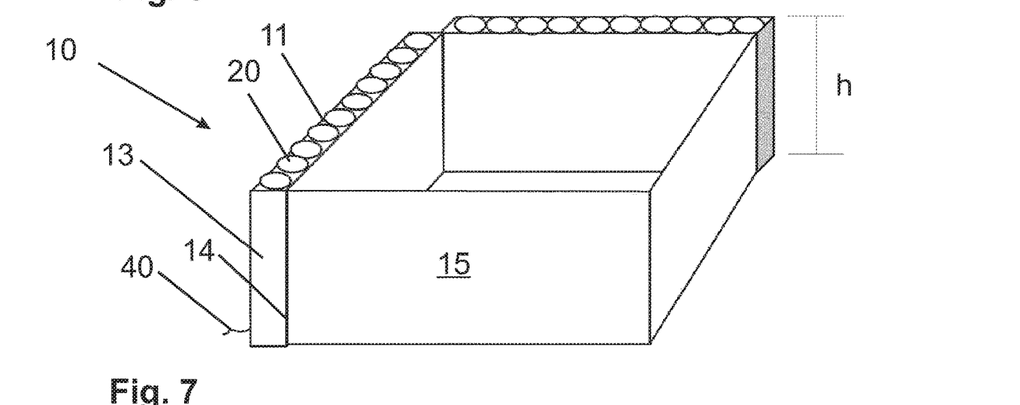
FIG. 7 shows a third embodiment of the firework battery according to the invention in a further usage position.

FIG. 7 shows the fourth embodiment of the firework battery 10 according to the invention in a second usage position, in which the support base 30 defined by the receiving parts 11 and the extension elements 15 is the largest. The extension elements 15 and the receiving parts 11 form square arrangements, in which the stability of the firework battery 10 is accordingly increased compared to the position shown in FIG. 6. According to FIG. 7, a fuse 40 is arranged on the one receiving part 11, wherein the fuse 40 extends along the first receiving part 11 in a manner not shown and is connected to the second receiving part 11 by way of the hinge part 14. A single ignition of the fuse end 40.1 thus allows both the pyrotechnic charges 20 of the first receiving part 11 and the pyrotechnic charges 20 of the second receiving part 11 to be ignited. This results in simple handling due to a single ignition of the fuse 40. Moreover, it is conceivable to route the fuse 40 through the extension elements 15, so that both the pyrotechnic charges 20 of the first receiving part 11 and the pyrotechnic charges 20 of the second receiving part 11 can also be activated in this way by a single ignition.

Figure 8:
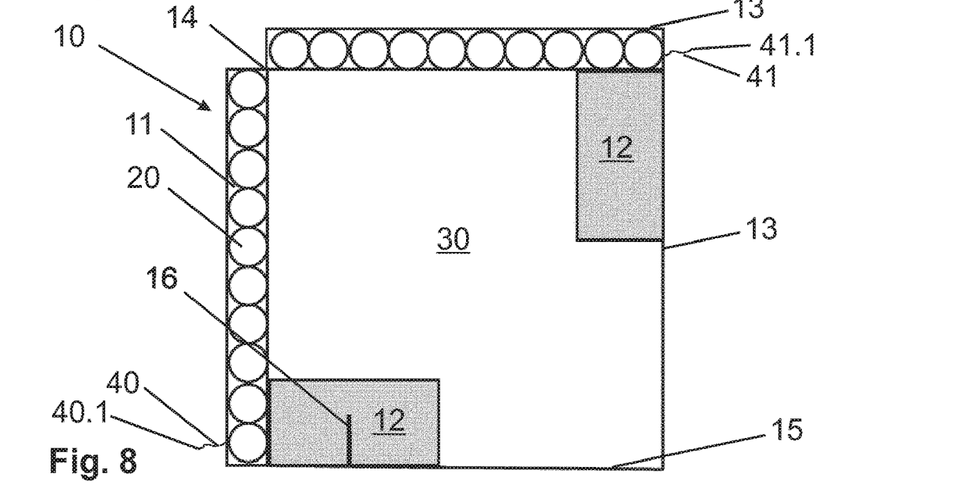
FIG. 8 shows a third embodiment of the firework battery according to the invention comprising brace elements.

FIG. 8 describes the fourth embodiment of a firework battery 10 according to the invention, which substantially corresponds to the form shown in FIG. 7, wherein brace elements 12 are additionally arranged on the receiving parts 11. Furthermore, it is also conceivable for the brace elements 12 to be arranged on the extension elements 15. As illustrated in FIG. 4, the brace elements 12 bring about increased rigidity of the firework battery 10 according to the invention, so that a displacement of the receiving parts 11 or of the extension elements 15 out of the usage position into the transport position is at least made more difficult. The brace elements 12 are connected via a hinge part 14 to a receiving part 11 or to an extension element 15, so that these can be folded along the hinge part 14. FIG. 8 shows the usage position of the brace elements 12, in which at least one edge of brace element 12 becomes seated against the extension element 15 and the receiving part 11, respectively. The brace elements 12 shown in FIG. 8 also yield the same advantages as were already described in FIG. 4. FIG. 8 furthermore shows a second fuse 41 having a fuse end 41.1 and a retaining element 16 according to the invention, which is arranged on an extension element 15 and becomes seated against a brace element 12.

Figure 9:
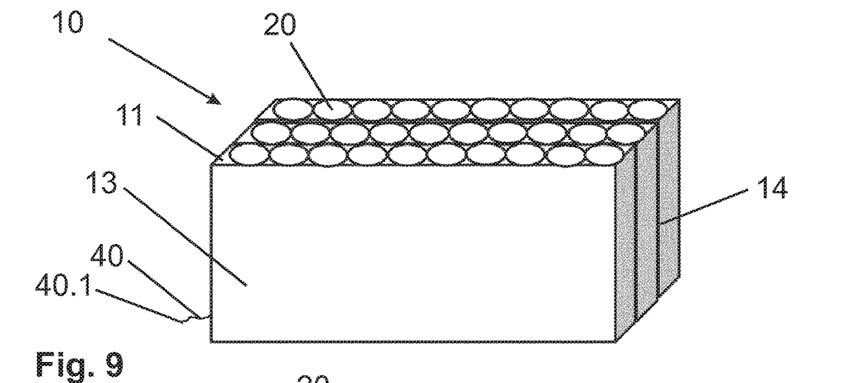
FIG. 9 shows a fourth embodiment of a firework battery according to the invention in the transport position.

FIG. 9 illustrates a fifth embodiment of the firework battery 10 according to the invention, which is formed by three receiving parts 11 having a plurality of pyrotechnic charges 20 arranged therein. In the illustrated transport position, the border 13 has the smallest possible circumference of the fifth embodiment.

Figure 10:
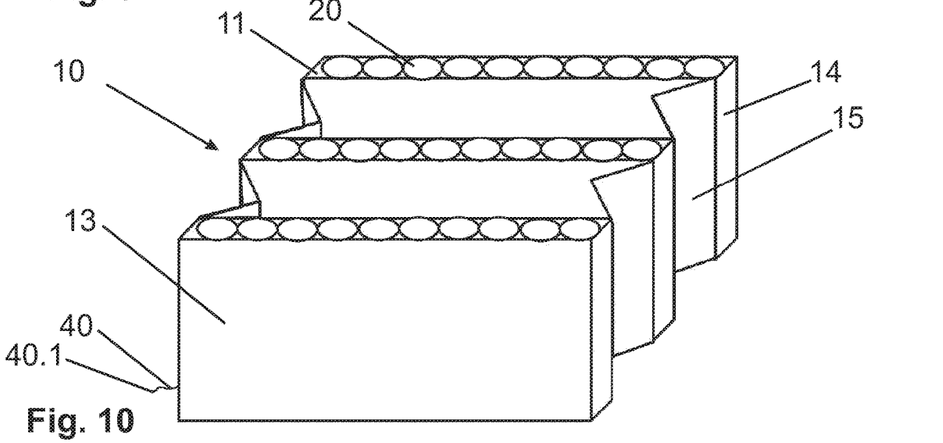
FIG. 10 shows a fourth embodiment of the firework battery according to the invention in a first usage position.

FIG. 10 shows the fifth embodiment of the firework battery 10 according to the invention, which is also shown in FIG. 9, wherein the extension elements 15 arranged between the receiving parts 11 are apparent in the shown first transport position. In the illustrated first usage position, the three receiving parts 11 are arranged spaced apart from one another in an accordion-like manner, so that the extension elements 15 between the receiving parts 11 have acute angles. This considerably increases the defined support base 30 of the firework battery 10 compared to the transport position illustrated in FIG. 9. The border 13 is lengthened by the illustrated extension elements 15, so that the receiving parts 11 are connected by the extension elements 15, resulting in increased stability of the firework battery 10.

FIG. 10 furthermore shows a fuse 40 having a fuse end 40.1, which is arranged on a receiving part 11 and used to ignite the pyrotechnic charges 20. According to the invention, it may be provided that the fuse 40 is routed through the extension elements 15, so that the further pyrotechnic charges 20 in the further receiving parts 11 can be ignited by igniting only a single fuse 40.

Figure 11:
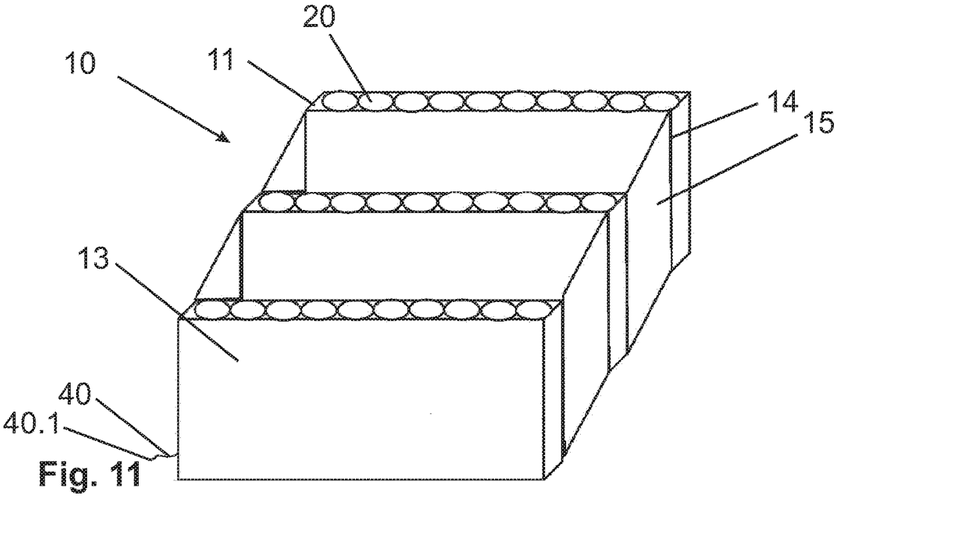
FIG. 11 shows a fourth embodiment of a firework battery according to the invention in a further usage position.

FIG. 11 shows the fifth embodiment of the firework battery 10 according to the invention in a second usage position, in which the defined support base 30 is the largest. Compared to the shape shown in FIG. 10, the extension elements 15 have a planar surface area, so that the support base 30 defined between the receiving parts 11 is the largest.

Depending on the length of the extension elements 15, the distance between the individual receiving parts 11 can be designed to be larger or smaller. However, the receiving parts 11 are always arranged parallel to and at a distance from one another. It is conceivable that both a rectangular and a trapezoidal arrangement of the firework battery 10 is made possible.

LIST OF REFERENCE NUMERALS 10 firework battery
11 receiving part
12 brace element
13 border
14 hinge part
15 extension element
16 retaining element
20 pyrotechnic charge
30 support base
40 fuse
40.1 fuse end
41 fuse
41.1 fuse end
H height of receiving part 11

What is claimed is:
1. A firework battery, comprising:
a plurality of receiving parts for a plurality of pyrotechnic charges;
a plurality of hinge parts connected to the plurality of receiving parts; and
a border connected to at least one foldable extension element that continues the border and arranged to connect between at least two of the plurality of receiving parts;
wherein an axis of rotation of each of the plurality of hinge parts is arranged vertically in relation to a ground, wherein the plurality of receiving and the at least one foldable extension element are movable relative to one another, whereby a bordered support base of the firework battery is enlarged;

wherein the at least one foldable extension element is secured by at least one foldable brace element.

2. The firework battery according to claim 1, wherein the plurality of receiving parts are secured by the at least one foldable brace element.

3. The firework battery according to claim 2, wherein the at least one foldable brace element is held by a foldable retaining element.

4. The firework battery according to claim 2, wherein at least one additional pyrotechnic charge is received on the at least one foldable brace element.

5. The firework battery according to claim 1, wherein the bordered support base has a closed border.

6. The firework battery according to claim 1, wherein a fold-out resistance of at least one of the plurality of receiving parts and/or of the at least one foldable extension element is established by way of an adhesive bond, or a perforation, or a thread.

7. The firework battery according to claim 1, wherein the at least one foldable extension element does not have the same height as the plurality of receiving parts.

8. The firework battery according to claim 1, wherein the at least one foldable extension element is folded out of at least one of the plurality of receiving parts.

9. The firework battery according to claim 1, wherein at least one of the plurality of hinge parts comprises a metal and/or plastic and/or cellulose.

10. The firework battery according to claim 1, wherein at least one fuse is arranged on the firework battery, whereby plurality of pyrotechnic charges are ignited.

11. The firework battery according to claim 10, wherein the fuse is used to pyrotechnically connect at least two of the plurality of receiving parts to one another and is routed through at least one the plurality of hinge parts, so that only a single ignition is required to start the plurality of pyrotechnic charges.

12. The firework battery according to claim 10, wherein at least one second fuse is arranged on at least one of the plurality of receiving parts and/or the at least one extension element, wherein an end of the at least one second fuse protrudes from the border.

13. The firework battery according to claim 1, wherein at least one additional pyrotechnic charge is received in the bordered support base.

14. The firework battery according to claim 1, wherein the plurality of receiving parts and/or the at least one foldable extension element are movable in relation to one another in a range of 30° to 120°.

15. The firework battery according to claim 1, wherein at least one fuse is arranged on the firework battery, whereby the plurality of pyrotechnic charges are ignited, whereby the fuse is arranged on at least one of the plurality of receiving parts and/or on the at least one foldable extension element.

16. The firework battery according to claim 1, wherein at least one fuse is arranged on the firework battery to ignite at least one of the plurality of pyrotechnic charges; wherein the fuse is arranged on at least one of the plurality of receiving parts and/or on the at least one extension element, and whereby the end of the fuse protrudes from the border.

17. The firework battery according to claim 1, wherein at least one additional pyrotechnic charge is secured by a retaining element.

18. The firework battery according to claim 1, wherein the at least one brace element is adapted to be folded from a transport position into a usage position about a horizontal axis of at least one of the plurality of receiving parts.

19. A method for enlarging the support base of a firework battery, comprising:

providing a plurality of receiving parts for a plurality of pyrotechnic charges, providing a border connected via a plurality of hinge parts to at least one foldable extension element that continues the border and that is arranged to connect between at least two the plurality of receiving parts, arranging an axis of rotation of each of the plurality of hinge parts vertically in relation to a ground, and securing the at least one foldable extension element by at least one foldable brace element;

wherein the plurality of receiving parts and the at least one foldable extension element are movable relative to one another, whereby a bordered support base of the firework battery is enlarged.

* * * * *